United States Patent
Choi et al.

(10) Patent No.: US 10,477,211 B2
(45) Date of Patent: Nov. 12, 2019

(54) IMAGE RE-ENCODING METHOD AND DEVICE THEREOF

(71) Applicant: Samsung Electronics Co., Ltd., Gyeonggi-do (KR)

(72) Inventors: Dai-woong Choi, Gyeonggi-do (KR); Woong-il Choi, Gyeonggi-do (KR); Dong-woo Kim, Gyeonggi-do (KR); A-rang Lee, Gyeonggi-do (KR); Jong-seok Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 15/524,055

(22) PCT Filed: May 21, 2015

(86) PCT No.: PCT/KR2015/005121
§ 371 (c)(1),
(2) Date: May 3, 2017

(87) PCT Pub. No.: WO2016/072576
PCT Pub. Date: May 12, 2016

(65) Prior Publication Data
US 2017/0332077 A1 Nov. 16, 2017

(30) Foreign Application Priority Data

Nov. 3, 2014 (KR) .................. 10-2014-0151213

(51) Int. Cl.
*H04N 19/124* (2014.01)
*H04N 19/40* (2014.01)
*H04N 19/172* (2014.01)

(52) U.S. Cl.
CPC ......... *H04N 19/124* (2014.11); *H04N 19/172* (2014.11); *H04N 19/40* (2014.11)

(58) Field of Classification Search
CPC ..................................................... H04N 19/40
See application file for complete search history.

(56) References Cited

U.S. PATENT DOCUMENTS 6,441,754 B1 * 8/2002 Wang .................. H04N 5/76
341/50
6,950,464 B1 9/2005 Shen et al.
(Continued)

FOREIGN PATENT DOCUMENTS

| CN | 1470132 | 1/2004 |
| CN | 1794815 | 6/2006 |
| JP | 2002-369208 | 12/2002 |

OTHER PUBLICATIONS

Heinz H. Bauschke et al., "Recompression of JPEG Images by Requantization", XP-011074411, IEEE Transactions on Image Processing, vol. 12, No. 7, Jul. 2003, 7 pages.
(Continued)

*Primary Examiner* — Mainul Hasan
(74) *Attorney, Agent, or Firm* — The Farrell Law Firm, P.C.

(57) ABSTRACT

A method of determining whether an image is to be re-encoded includes obtaining a first quantization matrix from an image file including the image, the image being encoded by quantization based on the first quantization matrix including a plurality of first quantization parameters; obtaining a second quantization matrix from a re-encoding device, the second quantization matrix including a plurality of second quantization parameters and having the same size as the first quantization matrix; determining a comparison coefficient based on elements greater than '0' among elements of a comparison matrix obtained by subtracting the first quantization matrix from the second quantization matrix; and determining that the image is to be decoded by inverse quantization based on the first quantization matrix and the
(Continued)

decoded image is to be re-encoded by quantization based on the second quantization matrix, when the comparison coefficient is greater than a first threshold value.

13 Claims, 12 Drawing Sheets

(56) References Cited

U.S. PATENT DOCUMENTS

| | | |
|---|---|---|
| 2003/0202582 A1 | 10/2003 | Satoh |
| 2006/0133479 A1 | 6/2006 | Chen et al. |
| 2008/0232464 A1 | 9/2008 | Tahara et al. |
| 2012/0314764 A1 | 12/2012 | Tidemann et al. |
| 2013/0051458 A1 | 2/2013 | Kitahara et al. |
| 2013/0064466 A1* | 3/2013 | Carmel ............... H04N 19/176 382/252 |
| 2014/0189141 A1 | 7/2014 | Kim |

OTHER PUBLICATIONS

Hani Sorial et al., "Selective Requantization for Transcoding of MPEG Compressed Video", XP-010511439, IEEE International Conference on Multimedia & Expo, 2000, 4 pages.

European Search Report dated Sep. 8, 2017 issued in counterpart application No. 15857097.8-1908, 8 pages.

International Search Report dated Aug. 18, 2015 issued in counterpart application No. PCT/KR2015/005121, 16 pages.

Chinese Office Action dated Jun. 26, 2019 issued in counterpart application No. 201580071118.6, 13 pages.

* cited by examiner

FIG. 3C

| | | | | | | | 330 |
|---|---|---|---|---|---|---|---|
| 10 | 9 | 10 | 3 | -3 | -7 | 23 | 39 |
| 8 | 7 | 4 | 1 | -15 | -15 | 11 | 27 |
| 2 | 5 | 0 | -12 | -19 | 8 | -9 | 1 |
| 2 | -1 | -13 | -19 | 12 | 21 | 40 | 32 |
| -5 | -9 | 19 | 15 | -5 | 7 | 30 | 14 |
| -18 | 18 | 10 | 29 | 12 | 34 | 50 | 49 |
| 15 | 0 | 26 | 15 | 36 | 20 | 40 | 60 |
| 3 | -4 | 10 | 35 | 20 | 60 | 69 | 49 |

| 10 | 8 | 7 | 5 | 3 | 2 | 1 | 1 |
|----|---|---|---|---|---|---|---|
| 8  | 7 | 5 | 3 | 2 | 1 | 1 | 1 |
| 7  | 5 | 3 | 2 | 1 | 1 | 1 | 1 |
| 5  | 3 | 2 | 1 | 1 | 1 | 1 | 2 |
| 3  | 2 | 1 | 1 | 1 | 1 | 2 | 3 |
| 2  | 1 | 1 | 1 | 1 | 2 | 3 | 4 |
| 1  | 1 | 1 | 1 | 2 | 3 | 4 | 5 |
| 1  | 1 | 1 | 2 | 3 | 4 | 5 | 5 |

500

IMAGE RE-ENCODING METHOD AND DEVICE THEREOF

PRIORITY

This application is a National Phase Entry of PCT International Application No. PCT/KR2015/005121, which was filed on May 21, 2015, and claims priority to Korean Patent Application No. 10-2014-0151213, which was filed on Nov. 3, 2014, the contents of each of which are incorporated herein by reference.

TECHNICAL FIELD

The present invention relates to a method of re-encoding an image to increase compression efficiency with respect to the image.

BACKGROUND ART

As hardware for reproducing and storing high-resolution or high-quality video content is being developed and supplied, a need for a compression scheme for effectively encoding or decoding the high-resolution or high-quality video content is increasing.

In particular, since the amount of information contained in a digital video signal is very large, it is essential to compress video data so as to efficiently store, detect, and transmit the information.

Thus, many video-data compression techniques have been developed. A Joint Photographic Experts Group (JPEG) format which is an international standard still-image compression format has been introduced in relation to video compression techniques.

However, a compression rate of the JPEG format is no higher than that of an image compression format that is widely compatible or other latest image compression formats. Thus, an image encoded in the JPEG format needs to be re-encoded in a format with a high compression rate.

DETAILED DESCRIPTION OF THE INVENTION

Technical Problem

Provided are a device and method for determining whether an image is to be re-encoded, in which whether an image filed is to be re-encoded is determined using a comparison between quantization matrices, according to an embodiment. Provided are also a program for implementing in a computer a method of determining whether an image is to be re-encoded, and a computer-readable recording medium having recorded thereon the program, according to an embodiment. Technical objectives to be accomplished in the embodiments are not, however, limited thereto and other technical objectives may be derived from the following embodiments.

Technical Solution

According to an embodiment, a method of determining whether an image is to be re-encoded includes obtaining a first quantization matrix from an image file including the image encoded by quantization based on the first quantization matrix including a plurality of first quantization parameters; obtaining a second quantization matrix from a re-encoding device, the second quantization matrix including a plurality of second quantization parameters and having the same size as the first quantization matrix; determining a comparison coefficient based on elements greater than '0' among elements of a comparison matrix obtained by subtracting the first quantization matrix from the second quantization matrix; and determining that the image is to be decoded by inverse quantization based on the first quantization matrix and the decoded image is to be re-encoded by quantization based on the second quantization matrix, when the comparison coefficient is greater than a first threshold value.

The determining of the comparison coefficient may include determining a number of the elements greater than '0' among the elements of the comparison matrix to be the comparison coefficient.

The determining that the image is to be decoded and the decoded image is to be re-encoded may include determining that the image is to be decoded and the decoded image is to be re-encoded when the comparison coefficient is greater than the first threshold value determined based on a size of the comparison matrix.

The determining of the comparison coefficient may include determining a value obtained by adding weights allocated to locations of the elements greater than '0' among the elements of the comparison matrix to be the comparison coefficient.

The determining that the image is to be decoded and the decoded image is to be re-encoded may include determining that the image is to be decoded and the decoded image is to be re-encoded when the comparison coefficient is greater than the first threshold value determined based on a size of the comparison matrix and on weights allocated to locations of the elements of the comparison matrix.

The method may further include determining that the image is not to be re-encoded when the image file includes an identifier indicating that the image has been encoded by quantization based on the second quantization matrix. The obtaining of the first quantization matrix may include obtaining the first quantization matrix when the image file does not include the identifier.

The method may further include determining a representative value of the plurality of first quantization parameters of the first quantization matrix; and determining that the image is not to be re-encoded when the representative value is greater than a second threshold value. The obtaining of the second quantization matrix may include obtaining the second quantization matrix when the representative value is less than the second threshold value.

According to an embodiment, a device for determining whether an image is to be re-encoded includes a first quantization matrix obtainer configured to obtain a first quantization matrix from an image file including the image encoded by quantization based on the first quantization matrix including a plurality of first quantization parameters; a second quantization matrix obtainer configured to obtain a second quantization matrix from a re-encoding device, the second quantization matrix including a plurality of second quantization parameters and having the same size as the first quantization matrix; and a re-encoding determiner configured to determine a comparison coefficient based on elements greater than '0' among elements of a comparison matrix obtained by subtracting the first quantization matrix from the second quantization matrix, and determine that the image is to be decoded by inverse quantization based on the first quantization matrix and the decoded image is to be re-encoded by quantization based on the second quantization matrix when the comparison coefficient is greater than a first threshold value.

The re-encoding determiner may be further configured to determine a number of the elements greater than '0' among the elements of the comparison matrix to be the comparison coefficient.

The re-encoding determiner may be further configured to determine that the image is to be decoded and the decoded image is to be re-encoded when the comparison coefficient is greater than the first threshold value determined based on a size of the comparison matrix.

The re-encoding determiner may be further configured to determine a value obtained by adding weights allocated to locations of the elements greater than '0' among the elements of the comparison matrix to be the comparison coefficient.

The re-encoding determiner may be further configured to determine that the image is to be decoded and the decoded image is to be re-encoded when the comparison coefficient is greater than the first threshold value determined based on a size of the comparison matrix and on weights allocated to locations of the elements of the comparison matrix.

The re-encoding determiner may be further configured to determine that the image is not to be re-encoded when the image file includes an identifier indicating that the image has been encoded by quantization based on the second quantization matrix. The first quantization matrix obtainer may be further configured to obtain the first quantization matrix when the image file does not include the identifier.

The re-encoding determiner may be further configured to determine a representative value of the plurality of first quantization parameters of the first quantization matrix, and to determine that the image is not to be re-encoded when the representative value is greater than a second threshold value. The second quantization matrix obtainer may be further configured to obtain the second quantization matrix when the representative value is less than the second threshold value.

A computer-readable recording medium having recorded thereon a program for implementing re-encoding determination methods according to various embodiments is suggested.

A program for implementing re-encoding determination methods according to various embodiments is suggested.

Advantageous Effect

Whether an image is to be re-encoded is determined using a method of determining whether an image is to be re-encoded. Thus, when images are re-encoded, an image having high re-compression efficiency may be selectively compressed. Accordingly, when a large amount of images are compressed, some images may be selectively compressed to prevent images which do not needed to be re-compressed from being re-compressed. Thus, computing resources of a computing system may be prevented from being wasted.

DESCRIPTION OF THE DRAWINGS

FIGS. 3A to 3C illustrate quantization matrices 310 and 320 and a comparison matrix 330 for explaining a re-encoding determination method of FIG. 5, according to an embodiment.

BEST MODE

Figure 1:
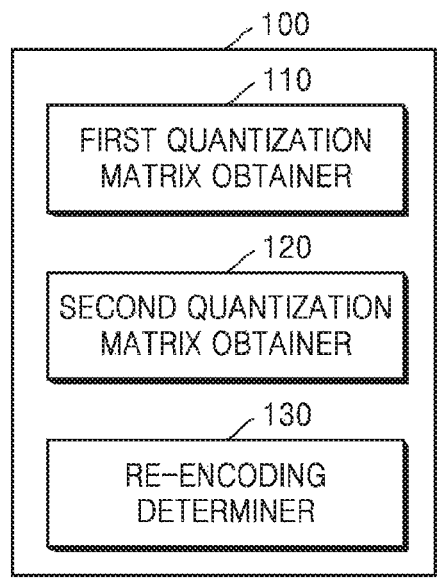
FIG. 1 is a block diagram of an image re-encoding determination device 100 for determining whether an image is to be re-encoded, according to an embodiment.

According to an embodiment, a method of determining whether an image is to be re-encoded includes obtaining a first quantization matrix from an image file including the image encoded by quantization based on the first quantization matrix including a plurality of first quantization parameters; obtaining a second quantization matrix from a re-encoding device, the second quantization matrix including a plurality of second quantization parameters and having the same size as the first quantization matrix; determining a comparison coefficient based on elements greater than '0' among elements of a comparison matrix obtained by subtracting the first quantization matrix from the second quantization matrix; and determining that the image is to be decoded by inverse quantization based on the first quantization matrix and the decoded image is to be re-encoded by quantization based on the second quantization matrix, when the comparison coefficient is greater than a first threshold value.

According to an embodiment, a device for determining whether an image is to be re-encoded includes a first quantization matrix obtainer configured to obtain a first quantization matrix from an image file including the image encoded by quantization based on the first quantization matrix including a plurality of first quantization parameters; a second quantization matrix obtainer configured to obtain a second quantization matrix from a re-encoding device, the second quantization matrix including a plurality of second quantization parameters and having the same size as the first quantization matrix; and a re-encoding determiner configured to determine a comparison coefficient based on elements greater than '0' among elements of a comparison matrix obtained by subtracting the first quantization matrix from the second quantization matrix, and determine that the image is to be decoded by inverse quantization based on the first quantization matrix and the decoded image is to be re-encoded by quantization based on the second quantization matrix when the comparison coefficient is greater than a first threshold value.

MODE OF THE INVENTION

The terminology used herein is for the purpose of describing particular embodiments only and is not intended to be limiting of the present disclosure. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated elements, operations, etc., but do not preclude the presence or addition of one or more other elements, operations, etc.

Hereinafter, the term 'image' should be understood as a still image. When an image to be decoded is an input image, an image reconstructed by decoding an input bitstream is a reconstructed image, and an image re-encoded by a re-encoding device is an output image, the term 'image' should be understood to include all the input image, the reconstructed image, and the output image. For example, the input image or the output image may be an image compressed in the JPEG format.

Hereinafter, the term 'image file' should be understood as a file including an encoded image and information related to the encoded image. The encoded image may be an image encoded in the JPEG format. The information related to the encoded image may include coding information such as a quantization matrix used in an image encoding process.

Methods of determining whether an image is to be re-encoded according to embodiments will be described with reference to FIGS. 1 to 10 below. Furthermore, a method of managing encoded image files by re-encoding images will be described with reference to FIGS. 1 to 13 below.

FIG. 1 is a block diagram of an image re-encoding determination device 100 for determining whether an image is to be re-encoded, according to an embodiment.

The image re-encoding determination device 100 may include a first quantization matrix obtainer 110, a second quantization matrix obtainer 120, and a re-encoding determiner 130.

The first quantization matrix obtainer 110 obtains a first quantization matrix from an image file including an image encoded by quantization based on a first quantization matrix including a plurality of first quantization parameters. The first quantization matrix obtainer 110 may obtain the first quantization matrix from a header of an encoded image file.

The second quantization matrix obtainer 120 may obtain a second quantization matrix including a plurality of second quantization parameters and having the same size as the first quantization matrix. The second quantization matrix obtainer 120 may obtain the second quantization matrix by transforming the first quantization matrix.

For example, a case in which a first element and a second element included in the first quantization matrix respectively correspond to a third element and a fourth element included in the second quantization matrix will be described below.

The second quantization matrix obtainer 120 according to an embodiment may set values of the third element and the fourth element with respect to the first element and the second element which are randomly selected, such that the difference between a value obtained by dividing a value of the first element by a value of the second element and a value obtained by dividing the value of the third element by the value of the fourth element is in a predetermined range. For example, when '10' and '5' which are elements of the first quantization matrix correspond to 'x' and 'y' which are elements of the second quantization matrix, values of 'x' and 'y' may be set to satisfy a condition that 'x/y' is greater than or equal to '1' and equal to or less than '3'.

When the first element included in the first quantization matrix corresponds to the third element included in the second quantization matrix, the second quantization matrix obtainer 120 according to an embodiment may set the value of the third element to a value obtained by multiplying the value of the first element by a value which is in the predetermined range. For example, if the predetermined range is greater than or equal to '10' and equal to or less than '15', an integer among '10' to '15' may be selected as the third element when the value of the first element is '1'. As another example, if the predetermined range is greater than or equal to '3' and equal to or less than '4', the value of the third element may be '6' and the value of the fourth element may be '12' when the value of the first element is '2' and the value of the second element is '3'. As another example, if the predetermined range is greater than or equal to '4' and equal to or less than '6', the value of the third element may be '18' and the value of the fourth element may be '16' when the value of the first element is '3' and the value of the second element is '4'.

Various methods may be used to determine a value to be multiplied to an element included in the first quantization matrix so as to determine an element included in the second quantization matrix. For example, a value to be selected from a predetermined range may be selected according to a predetermined rule, may be selected randomly, may be determined to be a specific value, may be determined according to the location of each of the elements of the first quantization matrix, or may be determined according to each of the elements of the first quantization matrix.

The second quantization matrix obtainer 120 according to an embodiment may produce the second quantization matrix based on a luminance value of a region quantized using the first quantization matrix.

For example, the second quantization matrix obtainer 120 may obtain an average luminance value of the region quantized using the first quantization matrix, and produce the second quantization matrix based on the average luminance value.

For example, an average element value which is an average of the values of the elements included in the second quantization matrix may be determined on the basis of an average luminance value which is an average of luminance values of samples included in an image or one of blocks of the image. The second quantization matrix obtainer 120 may set values of elements to be included in the second quantization matrix such that an average element value when the average luminance value is less than a specific value is less than an average element value when the average luminance value is greater than the specific value.

If an average of values of elements to be included in the second quantization matrix is determined to be proportional to the average luminance value, a degree of degradation of image quality when an image having a low average luminance value is re-encoded may be lower than that when an image having a high average luminance value is re-encoded.

A method of setting values of elements of a quantization matrix to be proportional to a luminance value may be appropriate to re-encode an image, the image quality of which is less degraded when a screen is dark than when the screen is light.

As another example, the second quantization matrix obtainer 120 may set values of elements to be included in the second quantization matrix such that an average element value when an average luminance value is less than a specific value is greater than that when the average luminance value is greater than the specific value.

When an average of values of elements to be included in the second quantization matrix is determined to be inversely proportional to an average luminance value, a degree of degradation of image quality when an image having a low average luminance value is re-encoded may be higher than that when an image having a high average luminance value is re-encoded.

A method of setting an average of values of elements of a quantization matrix to be inversely proportional to a luminance value may be appropriate to re-encode an image, the image quality of which is less degraded when a screen is dark than when the screen is light.

As another example, when a fifth element which is a random element included in the first quantization matrix corresponds to a sixth element included in the second quantization matrix, the sixth element may have a value obtained by multiplying a value to a value of the fifth element and adding a value to a result of the multiplication. For example, the second quantization matrix may include elements having values obtained by multiplying '5' to values of all the elements of the first quantization matrix and adding '7' to results of the multiplication.

The sizes of the first quantization matrix and the second quantization matrix may be determined beforehand. For example, the first quantization matrix and the second quantization matrix may be determined beforehand to have a size of 8×8.

The method of obtaining the second quantization matrix, performed by the second quantization matrix obtainer 120, described above is merely an example and thus the second quantization matrix obtainer 120 may obtain the second quantization matrix according to a different method.

The re-encoding determiner 130 may compare the first quantization matrix and the second quantization matrix with each other and determine whether an encoded image file is to be re-encoded according to a result of the comparison.

The re-encoding determiner 130 may determine a comparison coefficient on the basis of elements greater than '0' among elements of a comparison matrix obtained by subtracting the first quantization matrix from the second quantization matrix. When the comparison coefficient is greater than a first threshold value, the re-encoding determiner 130 may determine that an image is to be decoded by inverse quantization based on the first quantization matrix and the decoded image is to be re-encoded by quantization based on the second quantization matrix.

In one embodiment, the re-encoding determiner 130 may determine the number of the elements greater than '0' among the elements included in the comparison matrix to be a comparison coefficient. Then the re-encoding determiner 130 may determine the first threshold value on the basis of a size of the comparison matrix. For example, when the number of elements greater than '0' among elements of an 8×8 comparison matrix is '50', '50' is determined to be a comparison coefficient. When the first threshold value is determined to be a value corresponding to 75% of the number of the elements of the comparison matrix, the first threshold value may be determined to be '48' which is 75% of '64' which is the number of the elements of the 8×8 comparison matrix. In this case, the comparison coefficient '50' is greater than the first threshold value '48' and thus the re-encoding determiner 130 may determine that the encoded image file is to be re-encoded, as will be described in more detail with reference to FIGS. 5 and 6 below.

In one embodiment, the re-encoding determiner 130 may determine a value obtained by adding weights allocated to locations of elements greater than '0' among the elements of the comparison matrix to be the comparison coefficient. Furthermore, the re-encoding determiner 130 may determine the first threshold value on the basis of the size of the comparison matrix and the weights allocated to locations of the elements of the comparison matrix, as will be described in more detail with reference to FIGS. 7 and 8 below.

In one embodiment, the re-encoding determiner 130 may determine not to re-encode an image when an encoded image file includes an identifier indicating that the image has been encoded by quantization based on the second quantization matrix. In this case, the first quantization matrix obtainer 110 does not obtain the first quantization matrix. In contrast, when the encoded image file does not include the identifier, the first quantization matrix obtainer 110 may obtain the first quantization matrix, as will be described in more detail with reference to FIG. 9 below.

In one embodiment, the re-encoding determiner 130 may determine a representative value of first quantization parameters of the first quantization matrix, and determine not to re-encode the image when the representative value is greater than a second threshold value. In this case, the second quantization matrix obtainer 120 does not obtain the second quantization matrix, as will be described in more detail with reference to FIGS. 10 and 11 below.

Figure 2:
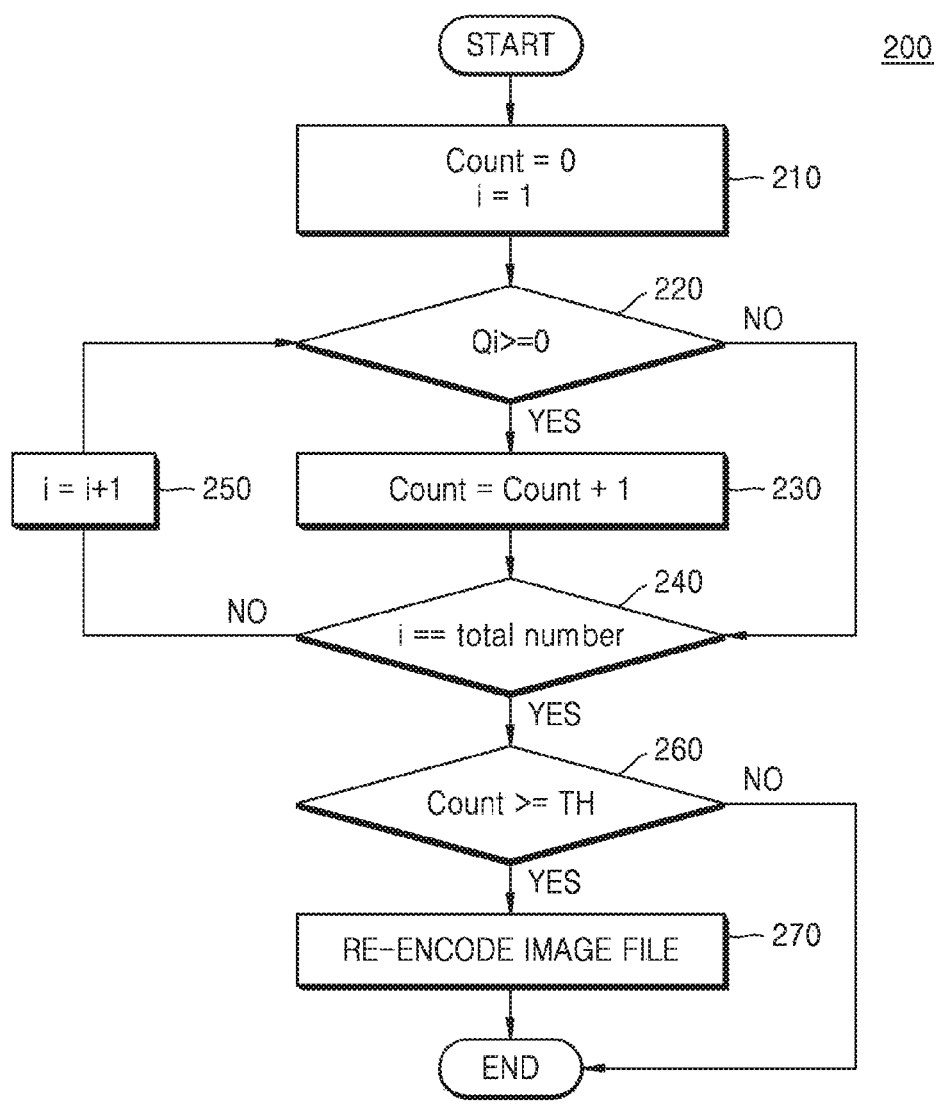
FIG. 2 is a flowchart of a re-encoding method 200 according to an embodiment.

FIG. 2 is a flowchart of a re-encoding method according to an embodiment. In detail, FIG. 2 is a flowchart of a re-encoding method, in which the number of elements greater than or less than '0' among elements of a comparison matrix is determined to be a comparison coefficient.

In one embodiment, a first quantization matrix and a second quantization matrix are compared with each other to determine whether re-encoding is to be performed. The first quantization matrix includes a first quantization parameter. Similarly, the second quantization matrix includes a second quantization parameter. The first quantization parameter at a point (i,j) on the first quantization matrix is compared with the second quantization parameter at a point (i,j) on the second quantization matrix.

A comparison matrix may be produced by subtracting the first quantization matrix from the second quantization matrix so that the first quantization matrix and the second quantization matrix may be easily compared with each other. Thereafter, the first quantization matrix and the second quantization matrix may be compared with each other on the basis of values of elements of the comparison matrix.

The number of elements greater than or equal to '0' among the elements of the comparison matrix may be determined to be a comparison coefficient. When the determined comparison coefficient is greater than a first threshold value, an image file is determined to be re-encoded.

The first threshold value may be determined on the basis of the number of elements of the first quantization matrix. For example, the first threshold value may be set to a value corresponding to 75% of the number of the elements of the first quantization matrix.

In FIG. 2, i represents an order of the elements of the comparison matrix. Count represents the number of elements greater than '0' among corresponding elements included in the comparison matrix. Q represents the comparison matrix. Qi represents the $i^{th}$ element of the comparison matrix. total number represents the total number of the elements of the comparison matrix. TH represents the first threshold value.

In operation S210, Count is set to '0' and i is set to '1'.

In operation S220, it is determined whether Qi is greater than or equal to '0'. When Qi is greater than or equal to '0', operation S230 is performed. When Qi is less than '0', operation S240 is performed.

In operation S230, Count is increased by '1'. Then operation S240 is performed.

In operation S240, it is determined whether i is equal to total number. When i is not equal to total number, operation S250 is performed. When i is equal to total number, operation S260 is performed.

In operation S250, i is increased by '1'. Then operation S220 is performed.

Operations S220 to S250 are repeatedly performed to determine whether all the elements of the comparison matrix are greater than or equal to '0'.

In operation S260, it is determined whether Count is greater than TH. When Count is greater than or equal to TH, operation S270 is performed. When Count is less than TH, it is determined that re-encoding is not to be performed.

In operation S270, the image file is re-encoded.

Figure 3A:
Figure 3B:

FIGS. 3A to 3C illustrate quantization matrices and a comparison matrix for explaining a re-encoding determination method to be described with reference to FIG. 5 below, according to an embodiment.

A first quantization matrix 310 illustrated in FIG. 3A includes first quantization parameters. A second quantization matrix 320 illustrated in FIG. 3B includes second quantization parameters. A comparison matrix 330 illustrated in FIG. 3C is a matrix obtained by subtracting the first quantization matrix 310 from the second quantization matrix 320. Thus, elements of the comparison matrix 330 are the same as values obtained by subtracting the first quantization parameters corresponding to the second quantization parameters from the second quantization parameters.

In the comparison matrix 330, the number of elements greater than or equal to '0' is '49'. Thus, a comparison coefficient is determined to be '49'. When a first threshold value is '50', the comparison coefficient is less than the first threshold value and thus an image file is determined to be not re-encoded. When the first threshold value is '40', the comparison coefficient is greater than the first threshold value and thus the image file is determined to be re-encoded.

8×8 quantization matrices and an 8×8 comparison matrix are described as an example with reference to FIG. 3. However, the re-encoding determination method to be described with reference to FIG. 3 below is applicable to quantization matrices and a comparison matrix having different sizes.

The quantization parameters used in FIG. 3 are randomly selected for convenience of explanation and thus different values may be selected.

Figure 4:
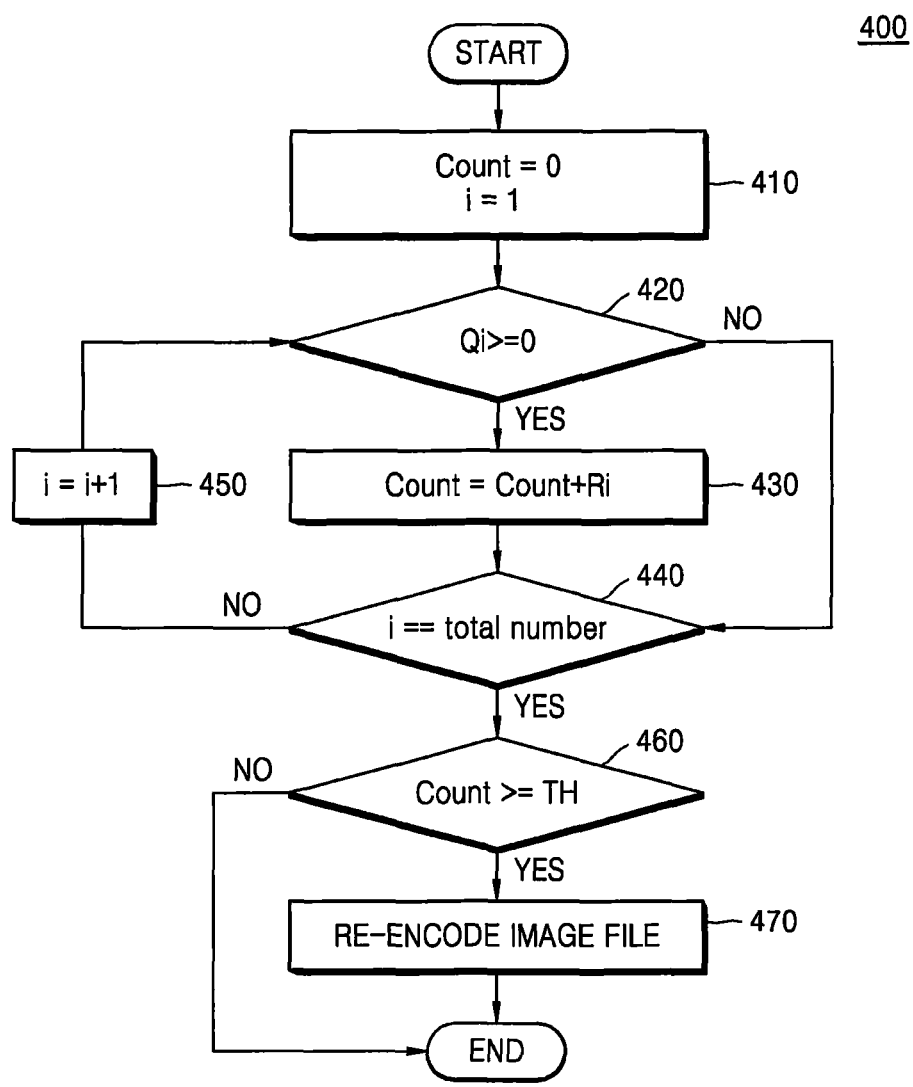
FIG. 4 is a flowchart of a re-encoding determination method 400 according to an embodiment.

FIG. 4 is a flowchart of a re-encoding determination method according to an embodiment. In detail, FIG. 4 illustrates a method of determining whether re-encoding is to be performed using a comparison coefficient determined in consideration of weights according to locations of elements a comparison matrix.

Transformation coefficients to be quantized vary according to a frequency region. In general, transformation coefficients corresponding to a DC or low-frequency region are large and transformation coefficients corresponding to a low-frequency region are relatively small. Thus, as quantization parameters for the transformation coefficients corresponding to the DC or low-frequency region are increased, compression effect according to re-encoding increases. Thus, higher weights may be allocated to the transformation coefficients corresponding to the DC or low-frequency region than those allocated to other transformation coefficients.

A change in a signal corresponding to a DC or low-frequency region is recognizable to human eyes but a change in a signal corresponding to a high-frequency region is difficult to recognize with human eyes. Thus, in a quantization process, quantization parameters corresponding to transformation coefficients of a high-frequency region are set to large values, thereby increasing compression efficiency. Thus, in a re-encoding process, when quantization parameters corresponding to transformation coefficients of a high-frequency region are increased, compression efficiency may be relatively increased by decreasing a degree of degradation of image quality. Accordingly, high weights may be allocated to the quantization parameters corresponding to the transformation coefficients of the high-frequency region.

Thus, when a first quantization matrix and a second quantization matrix are compared with each other, high weights may be allocated to the quantization parameters corresponding to the transformation coefficients of the DC or low-frequency region and the quantization parameters corresponding to the transformation coefficients of the high-frequency region.

In one embodiment, a weight matrix includes weights corresponding to quantization parameters. Weights allocated to quantization parameters on locations corresponding to elements of the weight matrix are given to the elements of the weight matrix. For example, a weight allocated to a quantization parameter at a point (1,1) on the quantization matrix is given to an element at a point (1,1) on the weight matrix.

The quantization parameters corresponding to the transformation coefficients of the DC or low-frequency region are located on an upper left portion of the quantization matrix. The quantization parameters corresponding to the transformation coefficients of the high-frequency region are located on a lower right portion of the quantization matrix. Thus, elements on the upper left portion and the lower right portion of the weight matrix are large.

The comparison coefficient is determined by elements greater than or equal to '0' among elements of the comparison matrix and the elements of the weight matrix. In detail, the comparison coefficient is determined by calculating locations of the elements greater than or equal to '0' among the elements of the comparison matrix and adding elements of the weight matrix corresponding to the locations of the elements.

For example, the comparison coefficient may be determined to be '24' when elements at points (1,1), (1,3), and (2,2) among the elements of the comparison matrix are greater than or equal to '0' and elements at points (1,1), (1,3), and (2,2) on the weight matrix are '10', '7', and '7'.

When the comparison coefficient is greater than a first threshold value, an image file is determined to be re-encoded.

The first threshold value may be determined based on the elements of the weight matrix. For example, the first threshold value may be determined to be 75% of a value obtained by adding the elements of the weight matrix together.

In FIG. 4, i represents an order of the elements of the comparison matrix. Count represents the sum of elements of the weight matrix corresponding to elements greater than or equal to '0' among corresponding elements of the comparison matrix. Q represents the comparison matrix. Qi represents the $i^{th}$ element of the comparison matrix. R represents the weight matrix. Ri represents the $i^{th}$ element of the weight matrix. FIG. 5 illustrates an example of a weight matrix. total number represents the total number of the elements of the comparison matrix. TH represents the first threshold value.

In operation S410, Count is set to '0' and i is set to '1'.

In operation S420, it is determined whether Qi is greater than or equal to '0'. When Qi is greater than or equal to '0', operation S430 is performed. When Qi is less than '0', operation S440 is performed.

In operation S430, Count is increased by Ri. Then operation S440 is performed.

In operation S440, it is determined whether i is the same as total number. When i is not the same as total number, operation S450 is performed. When i is the same as total number, operation S460 is performed.

In operation S450, i is increased by '1'. Then operation S420 is performed.

Operations S420 to S450 are repeatedly performed to determine whether all the elements of the comparison matrix are greater than or equal to '0'.

In operation S460, it is determined whether Count is greater than TH. When Count is greater than or equal to TH, operation S470 is performed. When Count is less than TH, the image file is determined to be not re-encoded.

In operation S470, the image file is re-encoded.

Figures 5, 6:
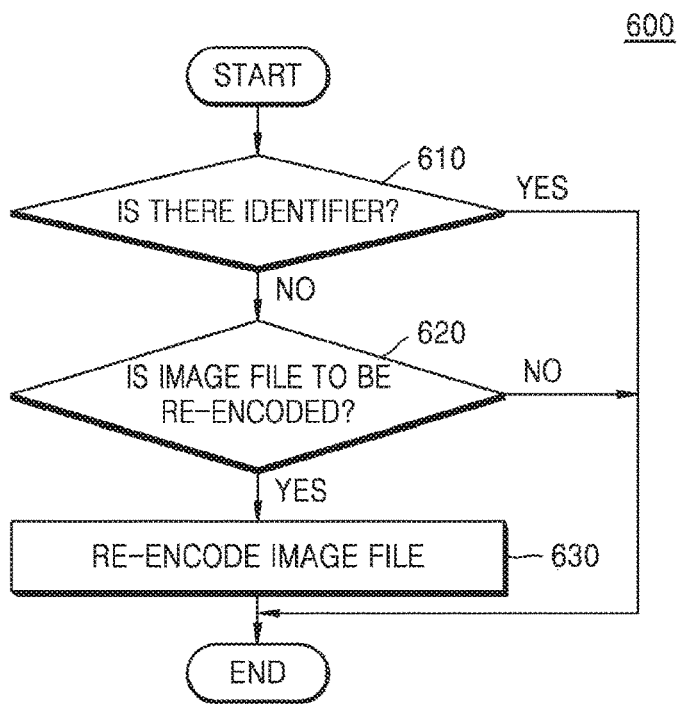
FIG. 5 illustrates a weight matrix 500 for explaining a re-encoding determination method, performed by a re-encoding determiner, according to an embodiment.
FIG. 6 is a flowchart of a re-encoding method 600 according to another embodiment.

FIG. 5 illustrates a weight matrix 500 for explaining a re-encoding determination method, performed by a re-encoding determiner, according to an embodiment.

The weight matrix 500 includes weights corresponding to the elements of the comparison matrix 330 of FIG. 3C. Thus, the weight matrix 500 has the same size as the comparison matrix 330.

The elements on an upper left portion and a lower right portion of the weight matrix 500 are greater than the other elements thereof. For example, an element at a point (1,1) on an 8×8 weight matrix has a size of 10 and an element at a point (8,8) on the 8×8 weight matrix has a size of 5. In contrast, an element at a point (5,5) on the 8×8 weight matrix has a size of 1 and is thus relatively small.

A comparison coefficient may be calculated by adding weights of the weight matrix 500 corresponding to the elements of the comparison matrix 330 which are greater than or equal to '0'. The comparison coefficient determined using the comparison matrix 330 and the weight matrix 500 is '142'. When a first threshold value is determined to be '140', an image file is determined to be re-encoded. When the first threshold value is determined to be '150', the image file is determined to be not re-encoded.

In FIG. 5, an 8×8 weight matrix is described as an example. However, the re-encoding determination method of FIG. 4 is also applicable to a weight matrix having a different size.

The weights of the weight matrix of FIG. 5 are randomly selected for convenience of explanation and thus different values may be selected.

FIG. 6 is a flowchart of a re-encoding method 600 according to another embodiment.

When an encoded image file has been re-encoded by the same re-encoder, the encoded image file need not be re-encoded by the re-encoder. Thus, before a first quantization matrix is obtained from the encoded image file, the encoded image file may be automatically determined to be not re-encoded when an identifier indicating that the encoded image file has been re-encoded is included in a header of the encoded image file.

Various methods may be used to allocate weights and calculate a comparison coefficient according to a weight matrix and quantization parameters used to compare the first quantization matrix and a second quantization matrix with each other, in addition to the method described above.

In operation S610, it is determined whether an identifier indicating that an image has been encoded by quantization based on the second quantization matrix is included in the image file. When the identifier is included, the re-encoding method 600 is ended without re-encoding the image file. When the identifier is not included, operation S620 is performed.

In operation S620, it is determined whether the image file is to be re-encoded. In operation S620, whether the image file is to be re-encoded may be determined according to the methods described with reference to FIGS. 5 to 8 above. When it is determined that the image file is not to be re-encoded, the re-encoding method 600 is ended. When it is determined that the image file is to be re-encoded, operation S630 is performed.

In operation S630, the image file is re-encoded.

Figures 7, 8:
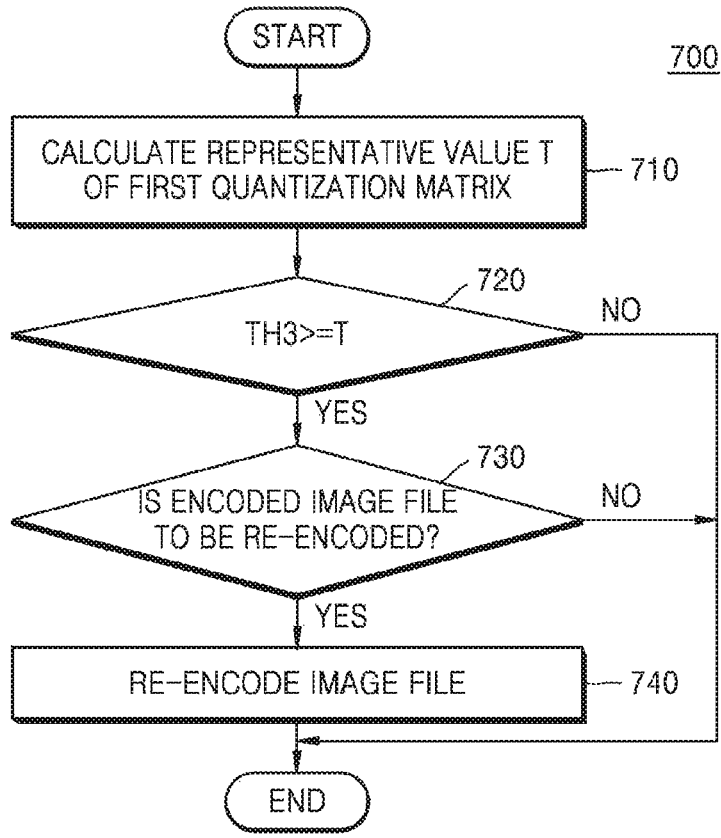
FIG. 7 is a flowchart of a re-encoding method 700 according to another embodiment.
FIG. 8 illustrates a first quantization matrix 800 for explaining a re-encoding determination method, performed by a re-encoding determiner, according to an embodiment.

FIG. 7 is a flowchart of a re-encoding method 700 according to another embodiment.

If first quantization parameters of a first quantization matrix are very large, a compression rate of an encoded image is very high. Accordingly, no compression effect is obtained or the quality of the image may be lowered and the image is thus damaged to a great extent when the encoded image is re-encoded. Thus, a representative value of the first quantization parameters is compared with a second threshold value, and the encoded image file may be determined to be not re-encoded when the representative value is greater than the second threshold value, before the first quantization parameters are compared with second quantization parameters.

In FIG. 7, T represents the representative value of the first quantization matrix. The representative value T may be determined by the first quantization parameters of the first quantization matrix. For example, the representative value T may be an average value of the first quantization parameters.

TH3 represents the second threshold value. The second threshold value TH3 is set to be very high so that an image file compressed at a high compression rate may be filtered.

In operation S710, the representative value T of the first quantization matrix is calculated.

In operation S720, it is determined whether the representative value T is less than the second threshold value TH3. If the representative value T is less than the second threshold value TH3, operation S730 is performed. In contrast, when the representative value T is greater than or equal to the second threshold value TH3, a re-encoding determination method is ended.

In operation S730, the first quantization parameters and second quantization parameters are compared with one another to determine whether the encoded image file is to be re-encoded. If the encoded image file is determined to be re-encoded, operation S740 is performed. In contrast, when the encoded image file is determined to be not re-encoded, the re-encoding determination method is ended.

In operation S740, the encoded image file is re-encoded.

FIG. 8 illustrates a first quantization matrix 800 for explaining a re-encoding determination method, performed by a re-encoding determiner, according to an embodiment.

First quantization parameters of the first quantization matrix 800 of FIG. 8 are generally large values. Thus, when an image has been encoded using the first quantization matrix 800, a compression rate of the image file may be enough high to be not re-encoded.

When a representative value T of the first quantization parameters is an average value of the first quantization parameters, the representative value T of the first quantization parameters of the first quantization matrix 800 is '123'. When a second threshold value TH3 is '100', the representative value T is greater than the second threshold value TH3 and thus the image file encoded using the first quantization matrix 800 is determined to be not re-encoded.

Figure 9:
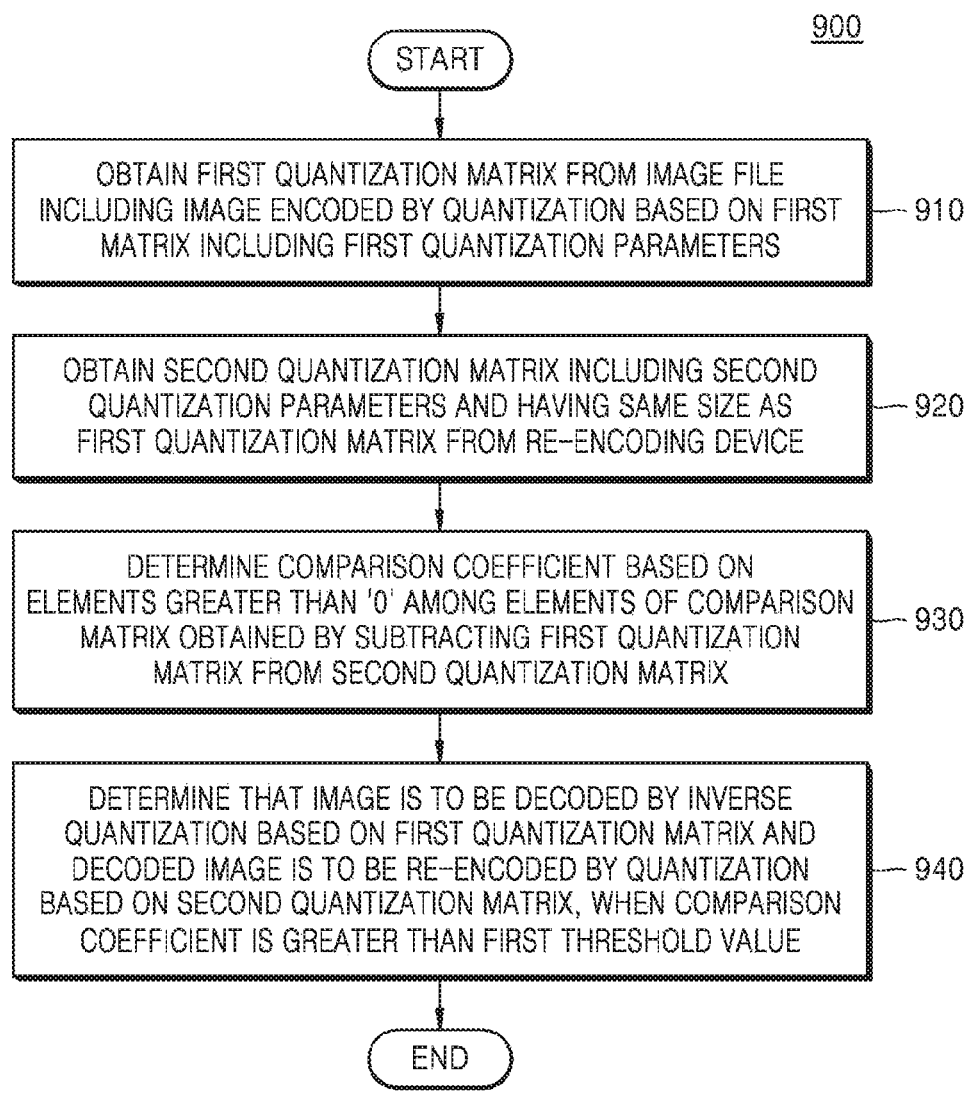
FIG. 9 is a flowchart of a re-encoding determination method 900 according to another embodiment.

FIG. 9 is a flowchart of a re-encoding determination method 900, performed by a re-encoding determination device, according to another embodiment.

In operation S910, a first quantization matrix including a plurality of first quantization parameters is obtained from an image file including an image encoded by quantization based on the first quantization matrix.

In operation S920, a second quantization matrix including a plurality of second quantization parameters and having the same size as the first quantization matrix is obtained from a re-encoding device.

In operation S930, a comparison coefficient is determined on the basis of elements greater than '0' among elements of a comparison matrix obtained by subtracting the first quantization matrix from the second quantization matrix.

For example, the number of the elements greater than '0' among the elements of the comparison matrix may be determined to be the comparison coefficient. In this case, a first threshold value may be determined on the basis of a size of the comparison matrix.

As another example, the first threshold value may be determined to be a value obtained by adding weights allocated to locations of the elements greater than '0' among the elements of the comparison matrix. In this case, the first threshold value is determined on the basis of the size of the comparison matrix and the weights allocated to the locations of the elements of the comparison matrix.

In operation S940, it is determined that the image is to be decoded by inverse quantization based on the first quantization matrix and the decoded image is to be re-encoded by quantization based on the second quantization matrix, when the comparison coefficient is greater than the first threshold value.

Figure 10:
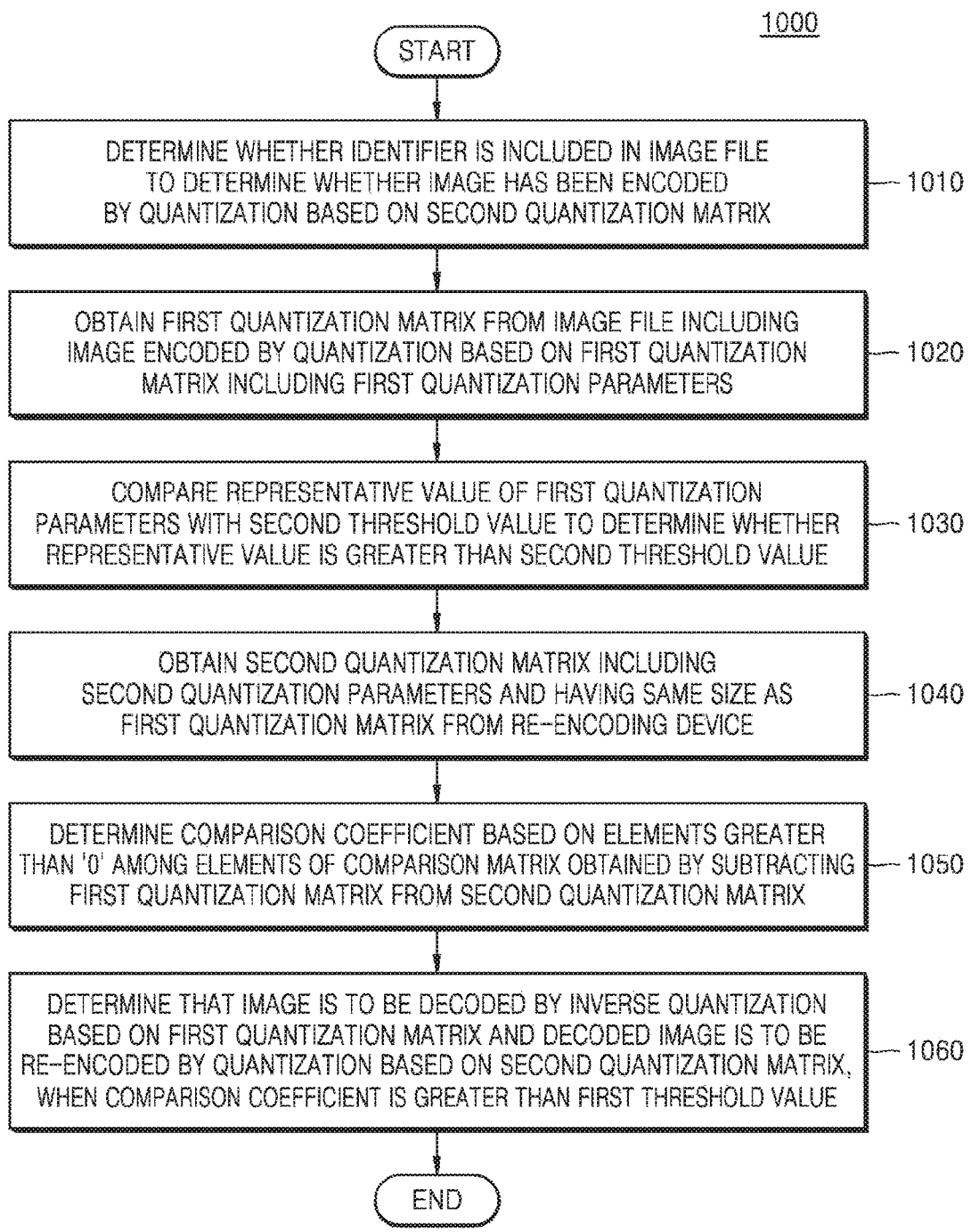
FIG. 10 is a flowchart of a re-encoding determination method 1000 according to another embodiment.

FIG. 10 is a flowchart of a re-encoding determination method 1000, performed by a re-encoding determination device, according to another embodiment.

In operation S1010, it is determined whether an image file includes an identifier indicating that an image has been encoded by quantization based on a second quantization matrix. When the identifier is included in the image file, the image is determined to be not re-encoded. When the identifier is not included in the image file, operation S1020 is performed.

In operation S1020, a first quantization matrix is obtained from an image file including an image encoded by quantization based on the first quantization matrix including a plurality of first quantization parameters.

In operation S1030, a representative value of the first quantization parameters of the first quantization matrix obtained in operation S1020 is determined, and it is determined whether the representative value is greater than a second threshold value. When the representative value is greater than the second threshold value, the image is determined to be not re-encoded. In contrast, when the representative value is less than second threshold value, operation S1040 is performed.

In operation S1040, the second quantization matrix including a plurality of second quantization parameters and having the same size as the first quantization matrix is obtained by a re-encoding device.

In operation S1050, a comparison coefficient is determined on the basis of elements greater than '0' among elements of a comparison matrix obtained by subtracting the first quantization matrix from the second quantization matrix.

In operation S1060, when the comparison coefficient is greater than a first threshold value, it is determined that the image is to be decoded by inverse quantization based on the first quantization matrix and the decoded image is to be re-encoded by quantization based on the second quantization matrix.

Figure 11:
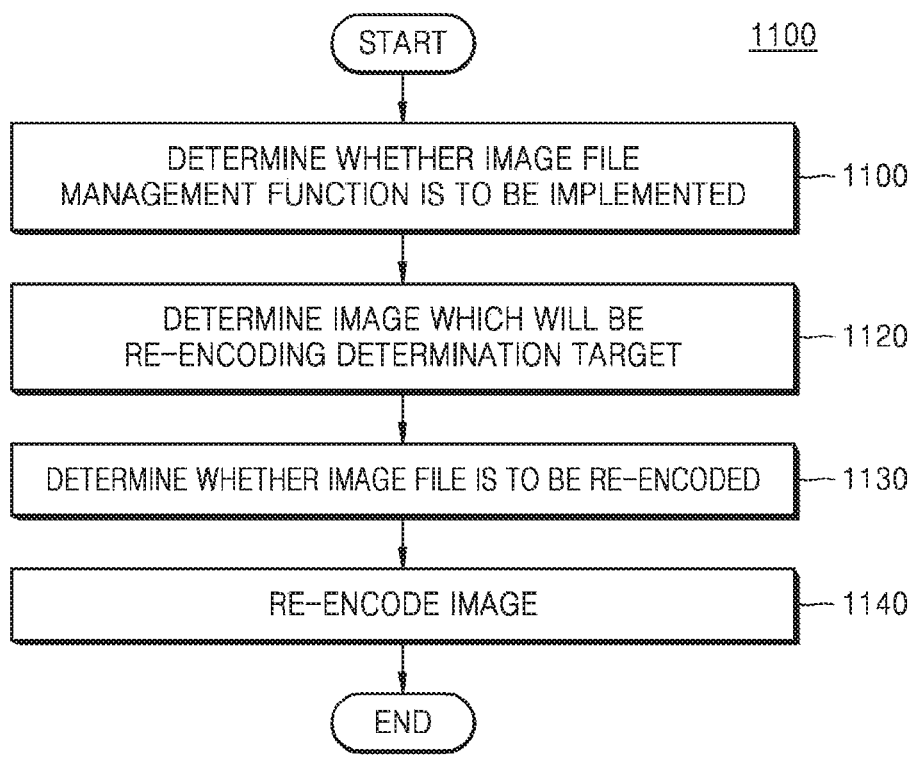
FIG. 11 is a flowchart of an encoded image file management method 1100 according to an embodiment.

FIG. 11 is a flowchart of an encoded image file management method 1100 according to an embodiment. In detail, FIG. 11 illustrates a flowchart of an encoded image file management method, in which when there is an encoded image file, an image is decoded and the decoded image file is re-encoded according to an encoding method having a higher compression rate to greatly reduce the amount of the image file.

In operation S1110, it is determined whether an image file management function is to be implemented. The image file management function is a function of determining an image file to be re-encoded from among encoded image files and re-encoding the determined image file to manage the amount of encoded images recorded on a recording medium. Whether the image file management function is to be implemented may be manually determined according to user input. Alternatively, when a specific condition is satisfied, whether the image file management function is to be implemented may be automatically determined.

For example, the image file management function may be automatically implemented at a specific time set by a user. In detail, when the user sets the image file management function to be implemented only at the specific time, a re-encoding device may perform re-encoding at the predetermined time and automatically end re-encoding at other times. The re-encoding device may statistically analyze a user's activity schedule and determine a specific time at which the image file management function is to be implemented. As another example, the image file management function may be automatically implemented in an airplane mode.

As another example, the image file management function may be set to perform re-encoding only when a device which implements the image file management function is in a charged state. As another example, the image file management function may be set to perform re-encoding only when a remaining battery capacity of a device which implements the image file management function is greater than or equal to a predetermined level. Thus, battery power may be prevented from being excessively consumed due to implementation of the image file management function.

As another example, the image file management function may be implemented when a remaining storage capacity of a device having the image file management function exceeds a reference level. As a concrete example, the image file management function may be set to be implemented when a total size of image files exceeds 20% of the storage capacity of a device.

As another example, the image file management function may be set to be automatically implemented when the image file management function has not been implemented for a long time period. As a concrete example, if the image file management function is set to be implemented once per week, the image file management function is implemented seven days after a day on which it was implemented lately.

As another example, the image file management function may be implemented when a central processing unit (CPU) and a memory of a device having the image file management function are used at a certain level or less. As a concrete example, if the image file management function is set to be implemented when the CPU and the memory of the device are used at 20% or less, the image file management function may be implemented when the number of applications which are being executed in the device is small and thus the CPU and the memory are used at 10%. In a similar embodiment, since temperature of a device having the image file management function increases according to the amount of calculation of a CPU of the device, the image file management function may be set to be implemented when the temperature of the device is low.

As another example, the image file management function may be automatically implemented in the airplane mode. In the airplane mode, execution of a large number of applications is restricted and execution of the image file management function is thus not a burden on the calculation of the CPU and the memory.

As another example, the image file management function may be automatically implemented while a function of a device having the image file management function other than an image file function is performed. As a concrete example, the image file management function may be implemented during execution of a navigation application (while driving), a fitness application (while exercising), or an e-book application (while reading).

As another example, the image file management function may be set to be not performed when throttling is performed on a CPU of a device having the image file management function. Throttling means an operation of decreasing the calculation performance of the CPU to reduce generation of heat due to the CPU when the CPU is overloaded and is thus heated to a certain temperature. Thus, when throttling is performed, the image file management function may be discontinued to decrease burden on the CPU.

As another example, the image file management function may be implemented when a device having the image file management function is not operated for a predetermined time period and a screen thereof is turned off. As a concrete example, if the image file management function is set to be implemented when the device is not operated for ten minutes, the image file management function is implemented when a user does not operate the device for ten minutes.

In operation S1120, an image which will be a re-encoding determination target is determined. In detail, an image satisfying a specific condition among a plurality of images stored in a storage device is determined to be a re-encoding determination target. The condition is set such that an image file, the image quality of which is not lowered to a great extent even when the image file is re-encoded is generally determined to be a target to be re-encoded.

For example, an image file having a bit size per pixel which is greater than or equal to specific bits may be determined to be a re-encoding determination target on the basis of a size of the image file or EXIF information contained in the image file. As a concrete example, when an image file having a bit size per pixel which is greater than or equal to 32 bits is set to be a re-encoding determination target, an image file having a bit size per pixel which is 16 bits is not determined to be a re-encoding determination target and an image file having a bit size per pixel which is 32 bits is determined to be a re-encoding determination target.

As another example, an image file having a resolution higher than a predetermined resolution may be determined to be a re-encoding determination target. As a concrete example, when an image file having a resolution higher than 1024×768 is set to be determined to be a re-encoding determination target, an image file having a resolution of 640×480 is not determined to be a re-encoding determination target and an image file having a resolution of 1024×768 is determined to be re-encoding determination target.

As a concrete example, when a ratio between a resolution of an image file and a resolution of a display is greater than or equal to a specific ratio, the image file may be determined as a re-encoding determination target. As a concrete example, when the display has a resolution of 1024×768 and an image file having a resolution higher than that of the display is determined to be a re-encoding determination target, an image file having a resolution of 1280×960 is a re-encoding determination target and an image file having a resolution of 640×480 is not a re-encoding determination target.

As another example, an image file stored in a specific folder designated by a user may be determined as a re-encoding determination target. As a concrete example, if the user determines image files stored at C:\Squeezing to be re-encoding determination targets, when the user copies an image file to C:\Squeezing, the image file copied to C:\Squeezing becomes automatically a re-encoding determination target.

As another example, an image file which will be a re-encoding determination target may be determined according to an image capturing device used to capture the image file on the basis of EXIF information of the image file. As a concrete example, when a specific image capturing device has high performance and thus an image file captured by this device has a high resolution and a large bit size per pixel, a user may determine the image file captured by the specific image capturing device to be a re-encoding determination target. Thus, the image file captured by the specific image capturing device is automatically determined as a re-encoding determination target.

As another example, when an image file is captured using EXIF information thereof, an image which will be a re-encoding determination target may be determined according to a shooting option of an image capturing device. As a concrete example, whether an image file will be a re-encoding determination target may be determined by extracting information regarding factors, such as an exposure time and an aperture value, which determine the image quality of an image file from the EXIF information of the image file.

As another example, an image file backed up in an external device may be determined to be a re-encoding determination target. When the image file is backed up in the external device, the image file may be reconstructed using a backup copy of the image file even if the image quality of the image file is lowered when the image file is re-encoded. Thus the image file backed up in the external device is determined to be a re-encoding determination target.

As another example, whether an image file is to be re-encoded may be determined according to a creation date thereof. In particular, an image file created a long time ago may be determined as a re-encoding determination target. As a concrete example, when an image file created 100 days ago or more is set to be determined to be a re-encoding determination target, an image file becomes automatically a re-encoding determination target on a $100^{th}$ day since the image file was created.

As another example, whether an image file is to be re-encoded may be determined according to a viewing rate. In particular, an image file with a low viewing rate may be determined to be a re-encoding determination target. As a concrete example, when an image file with a viewing rate of less than 50 times is set to a re-encoding determination target, an image file with a viewing rate of 100 times is not a re-encoding determination target and an image file with a viewing rate of 20 times is a re-encoding determination target.

As another example, an original image file of an image file modified using an image editing program or application may be determined to be a re-encoding determination target. When an original image file is modified using the image editing program or application, a user is likely to use a modified image file rather than the original image file and thus the original image file is determined to be a re-encoding determination target.

As another example, an image file downloaded from a server may be determined to be a re-encoding determination target. Since an original image file of the image file is stored in the server, the image file may be reconstructed using the original image file when the image quality of the image file is lowered as the image file is re-encoded. Thus, the image file downloaded from the server is a re-encoding determination target. Furthermore, even when an image file stored in another device is received, the image file may be easily reconstructed using an original image file thereof and thus the image file may be a re-encoding determination target.

As another example, a plurality of image files captured in a continuous shooting mode of an image capturing device may be re-encoding determination targets. As a concrete example, when a user selects one of a plurality of image files, the other image files except the selected image file may be re-encoding determination targets.

The conditions listed above may be applied solely in an embodiment. The conditions listed above may be applied in combination in another embodiment.

A condition of determining a re-encoding determination target is not, however, limited to the conditions listed above. Thus, an image file which will be a re-encoding determination target may be determined according to a condition other than the conditions listed above.

In operation S1130, it is determined whether the image file determined as the re-encoding determination target in operation S1120 is to be re-encoded.

In operation S1140, the image file determined to be re-encoded in operation S1130 is re-encoded. A re-encoding method will be described in detail with reference to FIG. 13 below.

Figure 12:
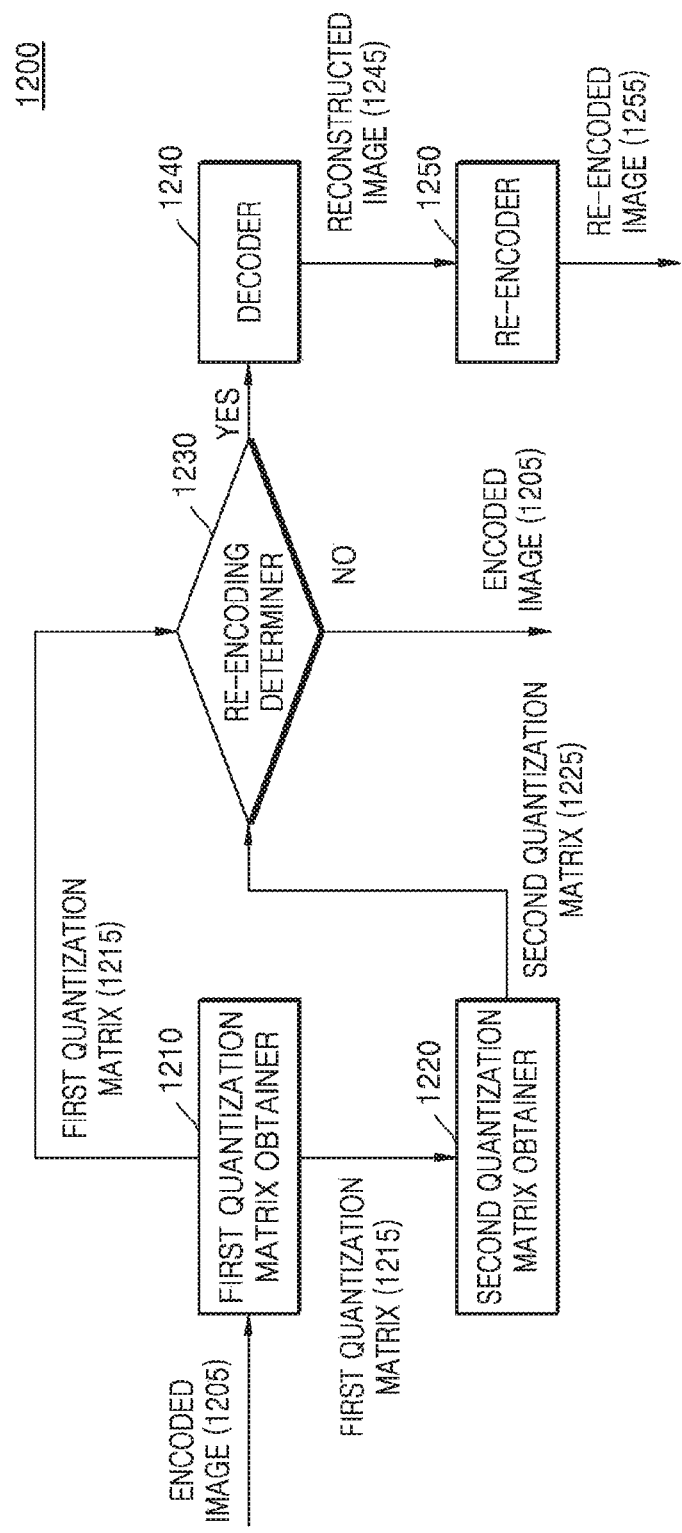
FIG. 12 is a block diagram of an image re-encoding device 1200 for re-encoding an image file by determining whether an image is to be re-encoded, according to an embodiment.

FIG. 12 is a block diagram of an image re-encoding device 1200 for re-encoding an image file by determining whether an image is to be re-encoded, according to an embodiment.

The image re-encoding device 1200 performs operations S1130 and S1140 of FIG. 11. The image re-encoding device 1200 may include a first quantization matrix obtainer 1210, a second quantization matrix obtainer 1220, a re-encoding determiner 1230, a decoder 1240, and a re-encoder 1250.

An encoded image file 1205 is an encoded image file determined to be re-encoded in operation S1120 of FIG. 11.

A first quantization matrix 1215 may be included in a header of the encoded image file 1205.

The first quantization matrix obtainer 1210 obtains the first quantization matrix 1215 from the encoded image file 1205. The first quantization matrix obtainer 1210 may obtain the first quantization matrix 1215 stored in the header of the encoded image file 1205.

The first quantization matrix 1215 is a matrix including first quantization parameters used in a quantization process included in a process of encoding the encoded image file 1205. The first quantization matrix 1215 may be used in a decoding process of reconstructing the encoded image file 1205 to obtain a reconstructed image file 1245.

The second quantization matrix obtainer 1220 obtains a second quantization matrix 1225 by transforming the first quantization matrix 1215 obtained by the first quantization matrix obtainer 1210. Various methods may be used to obtain the second quantization matrix 1225.

The second quantization matrix 1225 is obtained by transforming the first quantization matrix 215 by the second quantization matrix obtainer 1220. The second quantization matrix 1225 may be used in a quantization process included in a process of re-encoding the reconstructed image file 1245.

The re-encoding determiner 1230 compares the first quantization matrix 1215 and the second quantization matrix 1225 with each other, and determines whether the encoded image file 1205 is to be re-encoded according to a result of the comparison. Methods of comparing the first quantization matrix 1215 and the second quantization matrix 1225 with each other according to embodiments are as described above with reference to FIGS. 1 to 10.

When the re-encoding determiner 1230 determines that the encoded image file 1205 is to be re-encoded, the encoded image file 1205 and the first quantization matrix 1215 are transmitted to the decoder 1240. When the re-encoding determiner 1230 determines that the encoded image file 1205 is not to be re-encoded, the encoded image file 1205 is output as an output of the image re-encoding device 1200.

The decoder 1240 obtains the reconstructed image file 1245 by decoding the encoded image file 1205. The decoder 1240 may use coding information such as the first quantization matrix 1215 used in an encoding process of obtaining the encoded image file 1205.

The reconstructed image file 1245 is an image file obtained by decoding the encoded image file 1205.

The re-encoder 1250 obtains a re-encoded image file 1255 by re-encoding the reconstructed image file 1245. The re-encoder 1250 may use the second quantization matrix 1225 in a quantization process included in a re-encoding process.

The re-encoded image file 1255 is obtained by re-encoding the reconstructed image file 1245. The re-encoded image file 1255 has a higher compression rate than that of the encoded image file 1205. The re-encoded image file 1255 is obtained by the re-encoder 1250 and is then output as an output of the image re-encoding device 1200.

The operations of the decoder 1240 and the re-encoder 1250 will be described in more detail with reference to FIG. 13 below.

Figure 13:
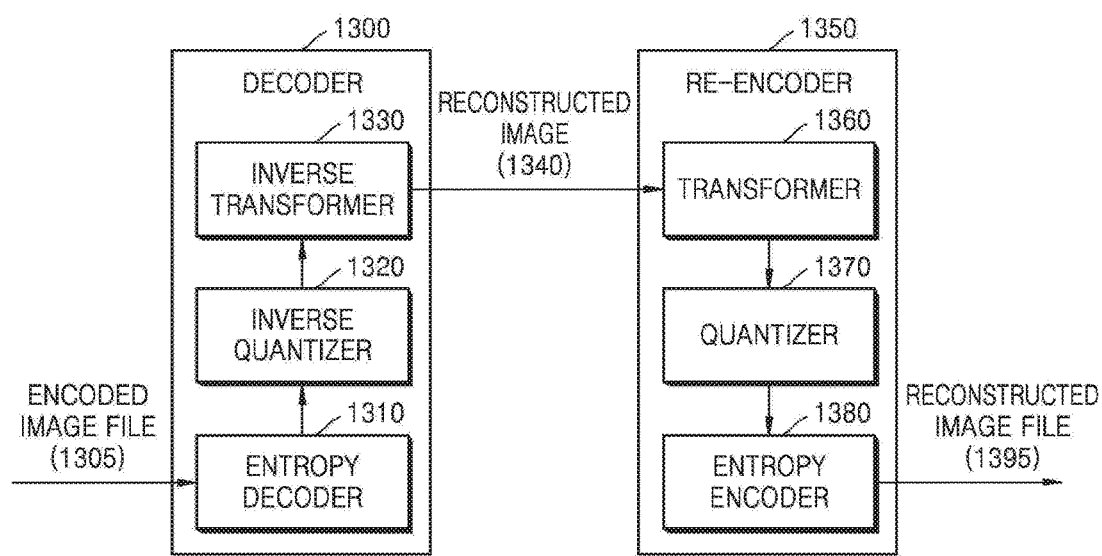
FIG. 13 is a block diagram of an image re-encoding device for re-encoding an image, according to an embodiment.

FIG. 13 is a block diagram of an image re-encoding device for re-encoding an image, according to an embodiment.

A decoder 1300 of FIG. 13 is one embodiment of the decoder 1240 of FIG. 12. Similarly, a re-encoder 1350 of FIG. 13 is one embodiment of the re-encoder 1250 of FIG. 12.

The decoder 1300 may include an entropy decoder 1310, an inverse quantizer 1320, and an inverse transformer 1330.

The entropy decoder 1310 parses an encoded image file 1305 to obtain an encoded image to be decoded and coding information needed to decode the encoded image. The entropy decoder 1310 may entropy decode a header of the encoded image file 1305 to obtain a first quantization matrix for inversely quantizing the encoded image. Furthermore, the entropy decoder 1310 may entropy decode the encoded image of the encoded image file 1305 to obtain quantized transformation coefficients generated in units of blocks.

The inverse quantizer 1320 reconstructs transformation coefficients by inversely quantizing the quantized transformation coefficients generated in units of blocks by using first quantization parameters included in the first quantization matrix.

The inverse transformer 1330 inversely transforms the transformation coefficients reconstructed by the inverse quantizer 1320 to obtain a reconstructed image 1340. The inverse transformer 1330 may inversely transform the transformation coefficients by performing inverse discrete cosine transformation.

A reconstructed image file obtained by the decoder 1300 is input to the re-encoder 1350.

The re-encoder 1350 may include a transformer 1360, a quantizer 1370, and an entropy encoder 1380.

The transformer 1360 may transform the reconstructed image 1340 in units of blocks to obtain transformation coefficients and output the transformation coefficients. For example, the transformer 1360 may perform discrete cosine transformation on the reconstructed image 1340 in units of 8×8 pixel blocks, and output transformation coefficients.

The quantizer 1370 may quantize the transformation coefficients output from the transformer 1360 by using a second quantization matrix and output the quantized transformation coefficients to the entropy encoder 1380.

The entropy encoder 1380 may entropy encode the quantized transformation coefficients to produce a re-encoded image file 1395. When entropy encoding is performed, a small number of bits may be allocated to a symbol with high frequency of occurrence and a large number of bits may be allocated to a symbol with low frequency of occurrence. Thus, in this case, a bitstream including bit strings representing symbols may be shorter than that when bit strings are randomly allocated to symbols. Accordingly, the compression performance of video coding may be increased by entropy coding. For entropy coding, the entropy encoder 1380 according to an embodiment may use a variable length coding (VLC) method.

The above embodiments of the present invention can be embodied as a computer program. The computer program may be stored in a non-transitory computer-readable recording medium, and executed using a general digital computer. Examples of the non-transitory computer-readable recording medium include a magnetic recording medium (e.g., a ROM, a floppy disc, a hard disc, etc.), and an optical recording medium (a CD-ROM, a DVD, etc.).

The invention claimed is:

1. A method of determining whether an image is to be re-encoded, the method comprising:
   obtaining a first quantization matrix from an image file including the image, the image being encoded by quantization based on the first quantization matrix including a plurality of first quantization parameters;
   obtaining a second quantization matrix from a re-encoding device, the second quantization matrix including a plurality of second quantization parameters and having the same size as the first quantization matrix;
   determining a comparison coefficient corresponding to a cumulative number of elements greater than '0' in a comparison matrix obtained by subtracting the first quantization matrix from the second quantization matrix; and
   when the comparison coefficient is greater than a first threshold value, determining that the image is to be decoded by inverse quantization based on the first quantization matrix and the decoded image is to be re-encoded by quantization based on the second quantization matrix.

2. The method of claim 1, wherein determining that the image is to be decoded and the decoded image is to be re-encoded comprises determining that the image is to be decoded and the decoded image is to be re-encoded when the comparison coefficient is greater than the first threshold value determined based on a size of the comparison matrix.

3. A method of determining whether an image is to be re-encoded, the method comprising:
   obtaining a first quantization matrix from an image file including the image, the image being encoded by quantization based on the first quantization matrix including a plurality of first quantization parameters;
   obtaining a second quantization matrix from a re-encoding device, the second quantization matrix including a plurality of second quantization parameters and having the same size as the first quantization matrix;
   determining a comparison coefficient corresponding to a cumulative value obtained by adding weights allocated to locations of the elements greater than '0' among the elements of the comparison matrix to be the comparison coefficient; and
   when the comparison coefficient is greater than a first threshold value, determining that the image is to be decoded by inverse quantization based on the first quantization matrix and the decoded image is to be re-encoded by quantization based on the second quantization matrix.

4. The method of claim 3, wherein determining that the image is to be decoded and the decoded image is to be re-encoded comprises determining that the image is to be decoded and the decoded image is to be re-encoded when the comparison coefficient is greater than the first threshold value determined based on a size of the comparison matrix and on weights allocated to locations of the elements of the comparison matrix.

5. The method of claim 1, when the image file includes an identifier indicating that the image has been encoded by quantization based on the second quantization matrix, further comprising determining that the image is not to be re-encoded, and
   wherein obtaining the first quantization matrix comprises obtaining the first quantization matrix when the image file does not include the identifier.

6. The method of claim 1, further comprising:
   determining a representative value of the plurality of first quantization parameters of the first quantization matrix; and
   determining that the image is not to be re-encoded when the representative value is greater than a second threshold value,
   wherein obtaining the second quantization matrix comprises obtaining the second quantization matrix when the representative value is less than the second threshold value.

7. A device for determining whether an image is to be re-encoded, the device comprising:
   a memory configured to store instructions; and
   a processor configured to execute the instructions, causing the processor to:
   obtain a first quantization matrix from an image file including the image, the image being encoded by quantization based on the first quantization matrix including a plurality of first quantization parameters,
   obtain a second quantization matrix from a re-encoding device, the second quantization matrix including a plurality of second quantization parameters and having the same size as the first quantization matrix,
   determine a comparison coefficient corresponding to a cumulative number of elements greater than '0' in a comparison matrix obtained by subtracting the first quantization matrix from the second quantization matrix, and
   when the comparison coefficient is greater than a first threshold value, determine that the image is to be decoded by inverse quantization based on the first quantization matrix and the decoded image is to be re-encoded by quantization based on the second quantization matrix.

8. The device of claim 7, wherein the processor is further configured to determine that the image is to be decoded and the decoded image is to be re-encoded when the comparison coefficient is greater than the first threshold value determined based on a size of the comparison matrix.

9. A device for determining whether an image is to be re-encoded, the device comprising:
   a memory configured to store instructions;
   a processor configured to execute the instructions, causing the processor to:
   obtain a first quantization matrix from an image file including the image, the image being encoded by quantization based on the first quantization matrix including a plurality of first quantization parameters,
   obtain a second quantization matrix from a re-encoding device, the second quantization matrix including a plurality of second quantization parameters and having the same size as the first quantization matrix,
   determine a comparison coefficient corresponding to a cumulative value obtained by adding weights allocated to locations of the elements greater than '0' among the elements of the comparison matrix, and
   when the comparison coefficient is greater than a first threshold value, determine that the image is to be decoded by inverse quantization based on the first quantization matrix and the decoded image is to be re-encoded by quantization based on the second quantization matrix.

10. The device of claim 9, wherein the processor is further configured to determine that the image is to be decoded and the decoded image is to be re-encoded when the comparison coefficient is greater than the first threshold value determined based on a size of the comparison matrix and on weights allocated to locations of the elements of the comparison matrix.

11. The device of claim 7, wherein the processor is further configured to:
    determine that the image is not to be re-encoded when the image file includes an identifier indicating that the image has been encoded by quantization based on the second quantization matrix, and
    obtain the first quantization matrix when the image file does not include the identifier.

12. The device of claim 7, wherein the processor is further configured to:
    determine a representative value of the plurality of first quantization parameters of the first quantization matrix, and to determine that the image is not to be re-encoded when the representative value is greater than a second threshold value, and
    obtain the second quantization matrix when the representative value is less than the second threshold value.

13. A non-transitory computer-readable recording medium having recorded thereon a program for performing the method of claim 1.

* * * * *